United States Patent
Åkesson et al.

(10) Patent No.: US 10,419,893 B2
(45) Date of Patent: Sep. 17, 2019

(54) EARLY MULTICAST-BROADCAST MULTIMEDIA SERVICE (MBMS) ANNOUNCEMENT

(71) Applicant: Telefonaktiebolaget LM Ericsson (publ), Stockholm (SE)

(72) Inventors: Joakim Åkesson, Landvetter (SE); Magnus Tränk, Lerum (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 15/800,356

(22) Filed: Nov. 1, 2017

(65) Prior Publication Data

US 2018/0054718 A1   Feb. 22, 2018

Related U.S. Application Data

(63) Continuation of application No. 14/655,506, filed as application No. PCT/EP2015/064167 on Jun. 23, 2015, now Pat. No. 9,860,714.

(51) Int. Cl.
  *H04H 20/71* (2008.01)
  *H04W 4/06* (2009.01)
  (Continued)

(52) U.S. Cl.
  CPC .......... *H04W 4/06* (2013.01); *H04W 72/005* (2013.01); *H04W 72/044* (2013.01); *H04W 72/0406* (2013.01)

(58) Field of Classification Search
  CPC . H04W 4/06; H04W 72/005; H04W 72/0406; H04W 72/044
  See application file for complete search history.

(56) References Cited

U.S. PATENT DOCUMENTS

2003/0231612 A1   12/2003   Kim et al.
2012/0099505 A1   4/2012   Wang et al.
(Continued)

FOREIGN PATENT DOCUMENTS

JP   2004166209 A   6/2004
JP   2009182944 A   8/2009
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Physical layer procedures (Release 12)", Technical Specification, 3GPP TS 36.213 V12.5.0, Mar. 1, 2015, pp. 1-239, 3GPP, France.

(Continued)

*Primary Examiner* — Abdelnabi O Musa
(74) *Attorney, Agent, or Firm* — Coats & Bennett, PLLC

(57) ABSTRACT

Service continuity is provided between Multicast-Broadcast Single Frequency Networks (MBSFNs) for a wireless device receiving a service. A radio base station broadcasts the service on a Multicast-Broadcast Multimedia Service (MBMS) resource of a first MBSFN. The radio base station also broadcasts information identifying a different MBMS resource over which the service is being broadcast by a different radio base station in a different MBSFN to enable service continuity between the first MBSFN and different MBSFN for the wireless device. The wireless device receives the service broadcast on the MBMS resource of the first MBSFN from the radio base station. The wireless device also receives the information that identifies the different MBMS resource over which the service is being broadcast by the different radio base station in the different MBSFN. The information enables service continuity (Continued)

between the first MBSFN and different MBSFN for the wireless device.

20 Claims, 10 Drawing Sheets

(51) Int. Cl.
*H04W 72/00* (2009.01)
*H04W 72/04* (2009.01)

(56) References Cited

U.S. PATENT DOCUMENTS

| | | | |
|---|---|---|---|
| 2012/0236776 A1* | 9/2012 | Zhang | H04W 48/12 370/312 |
| 2013/0039250 A1 | 2/2013 | Hsu | |
| 2013/0235783 A1 | 9/2013 | Wang et al. | |
| 2013/0294318 A1 | 11/2013 | Amerga et al. | |
| 2014/0162643 A1 | 6/2014 | Lee et al. | |
| 2014/0177436 A1* | 6/2014 | Korus | H04W 4/06 370/230 |
| 2014/0185455 A1* | 7/2014 | Balasubramanian | H04W 4/06 370/241 |
| 2014/0192698 A1 | 7/2014 | Anchan et al. | |
| 2016/0044634 A1 | 2/2016 | Seo et al. | |

FOREIGN PATENT DOCUMENTS

| | | | |
|---|---|---|---|
| JP | 2014522203 A | 8/2014 | |
| WO | 2014163335 A1 | 10/2014 | |

OTHER PUBLICATIONS

3rd Generation Partnership Project, "3rd Generation Partnership Project; Technical Specification Group Services and System Aspects; Group Communication System Enablers for LTE (GCSE_LTE) (Release 13)", Technical Specification, 3GPP TS 22468 V13.0.0, Dec. 1, 2014, pp. 1-22, 3GPP, France.

3rd Generation Partnership Project, "3rd Generation Partnership Project; Technical Specification Group Services and System Aspects; Group Communication System Enablers for LTE (GCSE_LTE); Stage 2 (Release 13)", Technical Specification, 3GPP TS 23.468 V13.0.0, Mar. 1, 2015, pp. 1-28, 3GPP, France.

3rd Generation Partnership Project, "3rd Generation Partnership Project; Technical Specification Group Radio Access Network; Introduction of the Multimedia Broadcast/Multicast Service (MBMS) in the Radio Access Network (RAN); Stage 2 (Release 12)", Technical Specification, 3GPP TS 25.346 V12.0.0, Mar. 1, 2014, pp. 1-71, 3GPP, France.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 12)", Technical Specification, 3GPP TS 36.331 V12.5.0, Mar. 1, 2015, pp. 1-445, 3GPP, France.

Samsung, "Sidelink measurements for relay UE selection", 3GPP TSG RAN WG1 Meeting #81, Fukuoka, Japan, May 25, 2015, pp. 1-2, R1-152856, 3GPP.

* cited by examiner

EARLY MULTICAST-BROADCAST MULTIMEDIA SERVICE (MBMS) ANNOUNCEMENT

This application is a continuation of prior U.S. patent application Ser. No. 14/655,506 filed on 25 Jun. 2015, which was the U.S. National Stage of International Application No. PCT/EP2015/064167 filed on 23 Jun. 2015, the disclosures of all of which are each expressly incorporated by reference herein in their entireties.

TECHNICAL FIELD

The present disclosure relates to a wireless communication system comprising at least a first Multicast-Broadcast Single Frequency Network (MBSFN) and a separate Radio Base Station (RBS) not comprised by the first MBSFN.

BACKGROUND

In group communication the same information or service is delivered to multiple users. If many users are located within the same area, multicast or broadcast based transmission using, e.g., Multicast-Broadcast Multimedia Services (MBMS) is efficient. In MBMS, one or more services are broadcasted to intended users by using one or more shared communications resources.

When a wireless device located in some area wishes to enter into group communication, such as MBMS, the wireless device must first determine if a wanted service is being broadcasted in that area. Given that the service is available, it must then determine what communications resources that are used for broadcasting said service, e.g., what frequency bands and time slots that are being used to deliver the service, before it can start to participate in the group communication. These initialization steps take time, which means that there is a delay associated with a wireless device starting to participate in a group communication. It is of course desired to minimize the delay associated with a wireless device entering into group communication.

If wireless devices wanting to participate in group communication are spread over an area wider than a Multicast-Broadcast Single Frequency Network (MBSFN) area, the service or services have to be delivered over multiple MBSFNs. It is then highly desirable to provide service continuity between MBSFN areas, meaning that a group communication can continue without a need to reestablish ongoing group calls as a wireless device moves from one MBSFN to another MBSFN.

A service continuity method disclosed in 3GPP TS 23.468 v.13.0.0 March 2015, relies on a methodology to transfer group communication from multicast to unicast; in unicast there is one information stream broadcast for each intended user. A user or wireless device which is taking part in a group communication and which moves from a first to a second MBSFN area will, according to the method disclosed in 3GPP TS 23.468 v.13.0.0 March 2015, need to first have its communication transferred by the network from multicast in the first MBSFN area to unicast, and then back to multicast in the second MBSFN area. This is an inefficient way to provide service continuity and which may fail, e.g., when the unicast network is congested. Furthermore, transferring a user or wireless device to unicast requires that the wireless device connects to and/or registers with the network, which may not be possible, or may at least be undesirable.

It is therefore desired to provide a wireless communication system that reduces the delay associated with a wireless device entering into a group communication, and which is able to handle a situation when a user moves from one MBSFN to another during an ongoing group call without having to transfer the communication from multicast to unicast.

SUMMARY

It is an object of the present disclosure to provide at least a radio base station (RBS), a wireless device, a wireless communication system, a server device, and methods that reduce the delay associated with a wireless device entering into a group communication by a first MBSFN.

It is a further object of the present disclosure to provide a wireless communication system and methods that are able to handle a situation when a user moves from one MBSFN area to another during an ongoing group call, i.e., service continuity, without having to rely on transferring the communication from multicast to unicast.

At least some of the objects mentioned above are obtained by an RBS arranged to broadcast information relating to a first communications resource used for broadcasting a service in a first MBSFN not comprising the RBS.

Hereby, a wireless device located in a coverage area of the RBS, moving towards a coverage area of the first MBSFN, and wanting to participate in group communication by the first MBSFN will receive information relating to the broadcasts in the first MBSFN area, from said RBS, prior to actually entering the coverage area of the first MBSFN. The wireless device can therefore prepare for group communication at an earlier point in time compared to if no broadcast information relating to the first communications resource used for broadcasting the service in the first MBSFN is obtained from the RBS.

Hence, delay associated with entering into group communication in the first MBSFN is reduced, since the wireless device can start to listen in on the group communication as soon as the broadcasted transport blocks can be received with sufficient signal quality. Furthermore, the wireless device does not have to connect to the network in order to receive the service by the first MBSFN, given that it can receive the information broadcasted by the RBS not comprised in the first MBSFN.

According to aspects, the information relating to the first communications resource comprises information for identifying the first communications resource in order to receive a broadcast comprising the service in the first MBSFN.

Hereby, as mentioned above, the wireless device will know how to receive the service broadcasted in the first MBSFN before it comes in reach of the first MBSFN.

Some objects mentioned above are also obtained by a wireless communication system comprising at least one RBS and also one or more further RBSs. The first MBSFN comprises the one or more further RBSs. The one or more further RBSs are arranged to broadcast transport blocks using the first communications resource, and the transport blocks are transporting the service to one or more wireless devices in the wireless communication system.

According to some aspects, the wireless communication system further comprises a second MBSFN at least partly separated from the first MBSFN. The at least one RBS is then associated to the second MBSFN and arranged to broadcast transport blocks using a second communications resource. The transport blocks using the second communications resource are transporting the service to one or more wireless devices in the wireless communication system.

A number of advantages are obtained by means of the proposed wireless communication system. Mainly, a less complicated service continuity process is provided, having a higher probability of being successful even in a congested network. Also, a wireless device may, by the proposed technique, move between different MBSFNs without connecting to a cellular network comprising the MBSFNs.

According to some other aspects, at least some of the one or more further RBSs comprised by the first MBSFN are arranged to broadcast information relating to the second communications resource used for broadcasting the service in the second MBSFN.

Hereby, a wireless device participating in group communication experiences further improvements in service continuity, which further improvements do not involve transferring a wireless device from multicast to unicast.

According to some additional aspects, the transport blocks broadcasted using the first and the second communications resource and transporting the service are combinable upon reception by a wireless device into combined transport blocks having an improved transport block quality compared to a transport block quality before combining.

Hereby, a wireless device will benefit from improved reception conditions due to the combining. On a network level, these improved reception conditions may allow for, e.g., a reduction in the number of reserved cells used in the wireless communication system. One or more service coverage areas related to MBMS may also be extended due to the combining.

There is also disclosed herein a wireless device arranged for MBSFN communication. The wireless device is arranged to receive information relating to a first communications resource used for broadcasting a service in a first MBSFN, from an RBS not comprised in the first MBSFN.

Hereby, delay associated with entering into group communication in the first MBSFN is reduced, as mentioned above.

According to aspects, the wireless device is arranged to receive first and second transport blocks using first and second communications resources, respectively, which first and second communications resources transport the service. The wireless device is also arranged to combine said received first and second transport blocks into a combined transport block having an improved transport block quality compared to a transport block quality before combining.

Hereby, the wireless device will benefit from improved reception conditions due to the combining, as mentioned above.

According to some other aspects, the wireless device is arranged to simultaneously store two or more MBSFN configurations relating to at least a first and to a second MBSFN.

Hereby, the wireless device is enable to receive broadcasts from two or more MBSFNs which MBSFNs the wireless device is presently not necessarily in coverage of. The wireless device is also enabled to receive broadcasts in one MBSFN while simultaneously evaluating received signal quality in another neighboring MBSFN.

At least some of the objects mentioned above are also obtained by a method performed in an RBS. The RBS is not comprised in a first MBSFN. The method comprises broadcasting, by the RBS, information relating to a first communications resource used for broadcasting a service in the first MBSFN.

At least some of the objects mentioned above are furthermore obtained by a method performed in a wireless communication system comprising a first MBSFN. The first MBSFN comprises one or more further RBSs. The wireless communication system also comprises at least one RBS not comprised by the first MBSFN. The method comprises broadcasting, by the one or more further RBSs comprised by the first MBSFN, transport blocks by using a first communications resource, the transport blocks transporting a service. The method also comprises broadcasting, by the at least one RBS not comprised by the first MBSFN, information relating to the first communications resource used for broadcasting the service in the first MBSFN.

There is also disclosed herein a method in a wireless device arranged for MBSFN communication. The method comprises receiving, by the wireless device, first and second transport blocks using first and second communications resources, from a first and from a second MBSFN, respectively, the transport blocks transporting a service. The method also comprises combining, by the wireless device, at least the received first and second transport blocks into a combined transport block having an improved transport block quality compared to a transport block quality before combining.

Apart from the above methods, there is also provided herein computer programs comprising computer program code which, when executed in a radio base station, a wireless communication system, a server device, or a wireless device, causes the respective apparatus or system to execute methods according to the present teaching.

The methods and computer programs display advantages corresponding to the advantages already described in relation to corresponding above-mentioned devices.

BRIEF DESCRIPTION OF THE DRAWINGS

The present disclosure will now be described in more detail with reference to the appended drawings.

DETAILED DESCRIPTION

Figure 1:
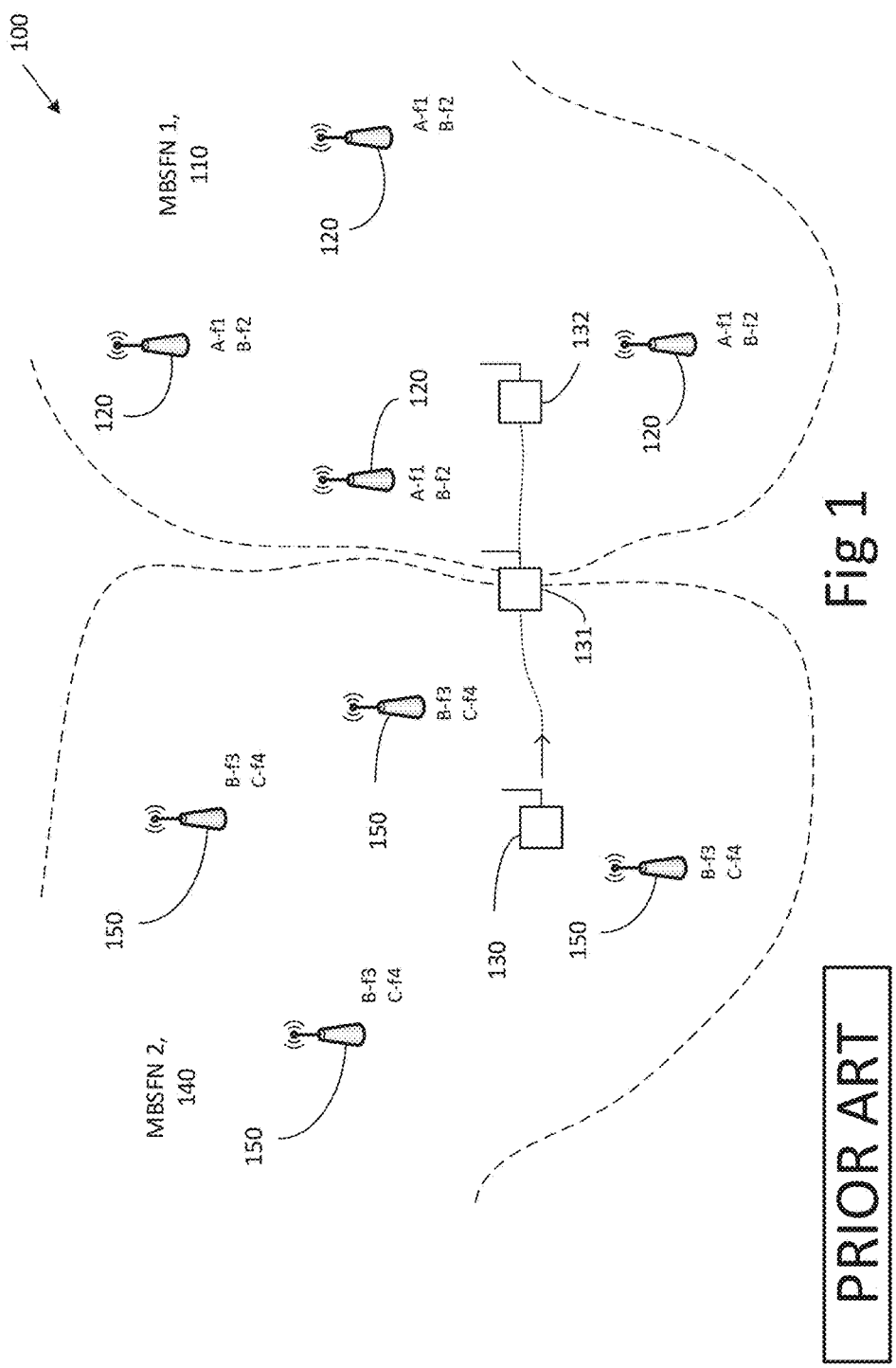
FIG. 1 shows a schematic view of a wireless communication system having first and second MBSFNs according to prior art.

Aspects of the present disclosure will now be described more fully with reference to the accompanying drawings.

The different devices, computer programs and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

FIG. 1 shows a schematic view of a wireless communication system 100 having two Multicast-Broadcast Single Frequency Networks (MBSFNs) according to prior art. A first MBSFN 110 comprises MBSFN transmitters 120, or Radio Base Stations (RBSs) which are arranged to broadcast two services; service A and service B. Service A is broadcasted using communications resource f1, and service B is broadcasted using communications resource f2.

The communications resources f1, f2, used for broadcasting vary from network to network and from system to system. One example of such a communications resource is a frequency band. Another example of a communications resource is a time slot. Of course, combinations of time slots and frequency bands may also be used to define specific communications resources. Thus, yet another example of a communications resource is a sub-frame in a Long Term Evolution (LTE) cellular communications system. Other communications resources which are conceivable for use in broadcast comprise different orthogonal codes or different orthogonal polarizations.

Broadcasted services and corresponding communications resources are illustrated in FIG. 1 next to each MBSFN transmitter and formatted as 'service—communications resource', e.g., 'A-f1' for service 'A' broadcasted using communications resource 'f1' and 'B-f2' for service 'B' broadcasted using communications resource 'f2'.

Herein, according to some aspects, MBSFNs are assumed to broadcast transport blocks according to TS 36.213 E-UTRA; physical layer procedures V12.5.0 March 2015. It is referred to this document, and references cited therein, for exemplary details regarding transport block format.

In one exemplary setting the wireless communication system is a Long Term Evolution (LTE) network. Here, a wireless device wanting to participate in group communication first receives System Information Block (SIB) 2 from an MBSFN transmitter. The SIB 2 contains information relating to the sub-frames that are being used for Multicast-Broadcast Multimedia Services (MBMS). The wireless device also receives SIB 13 which enables the wireless device to locate the so-called MBMS Control Channel (MCCH) in the LTE radio frame structure. The MCCH, in turn, carries information allowing the wireless device to discover which Temporary Mobile Group Identities (TMGI) that are available, and where broadcasted media corresponding to the TMGIs can be found, i.e., which communications resources that are used for broadcasting which services.

In addition to the mechanisms discussed above, a wireless device may also receive one or more service announcements. A service announcement is a message, often delivered wirelessly over the same network as the MBMS broadcast, which contains information about a broadcasted service. For instance, a service announcement may comprise information relating to an onset time of a particular broadcast, say a football game, and which TMGI that is associated with the broadcast. Once the service announcement has been received by a wireless device, the wireless device knows when to start listening to the group communication, and which communications resources to use during listening.

Further details of the SIB 2 and SIB 13 are given in, e.g., 3GPP TS 36.331 V.12.5.0 March 2015 and references cited therein. Further details on the MCCH are given in, e.g., 3GPP TS 25.346 V.12.0.0 March 2015 and references cited therein.

The two MBSFNs illustrated in FIG. 1 are associated with MBSFN areas or MBSFN coverage areas schematically marked in FIG. 1 by dashed lines. Herein, a coverage area is to be construed as a geographical area, volume, or region wherein a given transmitted radio signal can be received and the information carried by the radio signal successfully interpreted, possibly using also other sources, such as other radio signals transmitted in other coverage areas or networks. Thus, to exemplify, in case the radio signal carries data packets, a coverage area may be defined as an area where a probability of data packet loss after processing of any received radio signals is below some acceptable packet loss probability. In case the radio signal or signals carries voice, a coverage area may, e.g., be defined as an area wherein received signal quality after processing of any received radio signals is sufficient in order for voice quality to be at an acceptable level. A coverage area may also be defined as an area where a bit error rate in a received digital signal is below some acceptable level.

FIG. 1 also shows a wireless device 130, 131, 132, which moves from the second MBSFN 140 into the first MBSFN 110. The wireless device may, according to some aspects, be a mobile phone, a smart phone, a user equipment (UE), a laptop, or any other mobile wireless device with functionality to partake in group communication.

When the wireless device 130 is located within the coverage area of MBSFN 2, it can receive broadcasted services B and C on communications resources f3 and f4, respectively. However, as the wireless device 131 is leaving the second MBSFN 140, the radio transmissions on the second MBSFN will become weaker and weaker, and eventually services in the second MBSFN 140 can no longer be successfully delivered to the wireless device 131. Preferably, the wireless device should switch to receiving service B from the first MBSFN 110, i.e., there should be service continuity for service B between the two MBSFNs.

According to the service continuity method disclosed in 3GPP TS 23.468 v.13.0.0 March 2015, the wireless device will have its group communication, i.e., its services B and C, transferred to unicast.

It is noted that the transfer to unicast involves the wireless device connecting to the cellular network comprising the MBSFN, e.g., an LTE network or other cellular network, including future 5G cellular networks, in case the wireless device had not done so earlier.

In an LTE setting, a wireless device not having to connect to the cellular network, means that it can stay in Radio Resource Control (RRC) Idle mode where it is silent and its cell location is unknown. A wireless device connecting to the cellular network means that the wireless device has to enter RRC connected mode.

The wireless device 132 will eventually come in reach, and/or be handed over, to an RBS or eNodeB in the first MBSFN 110. The wireless device 132 will then receive SIBs and MCCH to learn about services offered in that first MBSFN, whereupon it can be transferred back from unicast to multicast in the first MBSFN. In the scenario illustrated in FIG. 1, the wireless device 132 may resume participating in group communication of service B. According to the example of FIG. 1, service C is not available in MBSFN 1.

Thus, there are several drawbacks associated with moving into an MBSFN, or moving between MBSFNs as illustrated in FIG. 1.

First, there is a delay associated with a wireless device starting to participate in a group communication which is undesirable. To understand this, consider a wireless device moving into the first MBSFN 110 and wishing to enter into group communication involving service A. The wireless device cannot determine if the service A is available in MBSFN 1 until it comes within coverage of MBSFN 1. Once the wireless device does become aware that service A is available within the first MBSFN the wireless device must determine what communications resources that are used for broadcasting said service, e.g., what frequency bands and time slots that are being used to deliver the service, before it can start to receive service A. These initialization steps take time, which means that there is a delay associated with a wireless device starting to participate in a group communication which is undesirable.

Second, the transfer to unicast represents a risk, since this transfer to unicast may not always be flawless and may lead to outage in the group communication. For instance, there may not be room for the transfer to unicast in case of congestion in the unicast network. Also, this transfer to unicast involves a significant amount of network signaling, which takes time. There is therefore in some cases a considerable delay associated with the transfer from multicast to unicast and back.

Figure 2:
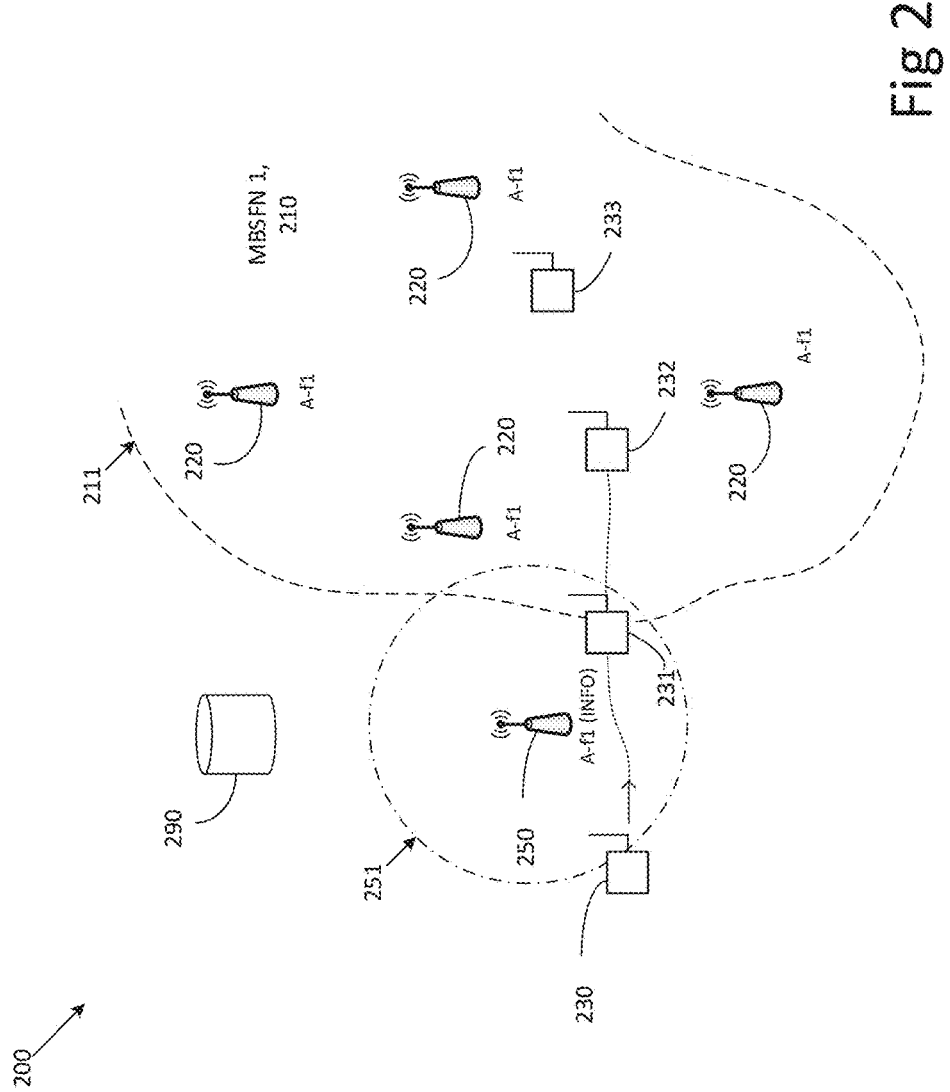
FIG. 2 shows a schematic view of a wireless communication system with an RBS and a first MBSFN not comprising the RBS according to aspects of the present disclosure.

FIG. 2 shows a schematic view of a wireless communication system having a first MBSFN 210 according to aspects of the present disclosure. The notation used and explained in connection to FIG. 1 has been re-used also in FIG. 2, and in particular the notation relating to services and communications resources, with one exception; An RBS only broadcasting information relating to a service and/or a given communications resource, and not broadcasting the actual service using the communications resource, is marked by the text '(INFO)'.

The wireless communication systems, wireless devices, and other system aspects mentioned in connection to FIG. 1 are conceivable also in FIG. 2. Thus, in one exemplary setting the wireless communication system 200 is a Long Term Evolution (LTE) network. Example communications resources mentioned in connection to FIG. 1 are applicable also in FIG. 2, as are the example wireless devices.

FIG. 2 shows an RBS 250 arranged to broadcast information relating to a first communications resource f1 used for broadcasting a service A in a first MBSFN 210. As shown in FIG. 2, the first MBSFN 210 does not comprise the RBS 250. This means that the RBS 250 shown as the left-most RBS in FIG. 2 is separate from the first MBSFN, in that it does not actually broadcast the services broadcasted by the further RBSs 220 comprised by the first MBSFN using the same communications resources.

In other words, the RBS 250 is not a part of the first MBSFN 210 and is therefore arranged to not broadcast transport blocks transporting the service A by using the first communications resource f1. This also means that the RBS 250 is not associated with the first MBSFN. It is noted that the RBS 250 may broadcast the same service or services as are broadcasted in the first MBSFN, but in this case the services are broadcasted using at least partly different communications resources.

As a consequence of the RBS 250 not being comprised by the first MBSFN 210, the RBS is arranged to broadcast information relating to the first communications resource f1 over a coverage area 251 different from a coverage area 211 of the first MBSFN 210.

According to some aspects, the information relating to the first communications resource f1 comprises information for identifying the first communications resource f1 in order to receive a broadcast comprising the service A in the first MBSFN 210. Thus, a wireless device located within the coverage area 251 of the left-most RBS 250, will receive information before it actually enters the coverage area of the first MBSFN which information enables it to listen to broadcasts from the first MBSFN immediately upon entering said coverage area.

According to some further aspects, a communications resource comprises any of a frequency band, a time slot, or a combination of a frequency band and time slot. In particular, as will be further discussed below, a communications resource may in an LTE setting comprise a sub-frame, or a sequence of sub-frames, possibly interleaved in time with other sub-frames.

As already noted, the wireless communication system 200 comprises, in addition to the RBS 250, also one or more further RBSs 220, or MBSFN transmitters. The first MBSFN 210 comprises the one or more further RBSs 220. The one or more further RBSs are arranged to broadcast transport blocks using the first communications resource f1. The transport blocks transport the above-mentioned service A to one or more wireless devices 231, 232, 233 in the wireless communication system 200. This is illustrated in FIG. 2 by 'A-f1' in connection to the RBSs comprised by the first MBSFN 210. An RBS marked in FIG. 2 by the 'A-f1 (INFO') is not comprised by the first MBSFN 210.

A wireless device 230 passing a coverage area 251 of the RBS 250, and moving towards the coverage area 211 of the first MBSFN 210 and wanting to participate in group communication by the first MBSFN will now receive information relating to the broadcasts in the first MBSFN area prior to actually coming in reach of a further RBS 220 associated with the first MBSFN. The wireless device can therefore prepare for group communication at an earlier point in time compared to if no broadcast information relating to the first communications resource f1 used for broadcasting service A in the first MBSFN is obtained from the RBS 250.

Hence, delay associated with entering into group communication in the first MBSFN is reduced, since the wireless device can start to listen in on the group communication as soon as the broadcasted transport blocks can be received with sufficient signal quality. Furthermore, the wireless device does not have to connect to the network in order to receive service A by the first MBSFN, given that it can receive the information broadcasted by the RBS 250 not comprised in the first MBSFN.

In an example Long Term Evolution (LTE) setting, a wireless device not having to connect to the cellular network, means that it can stay in Radio Resource Control (RRC) Idle mode where it is silent and its cell location is unknown. A wireless device connecting to the cellular network means that the wireless device has to enter RRC connected mode.

According to some aspects, the wireless communication system 200 is an LTE network, and the RBSs shown in FIG. 2 are eNodeBs comprised in the LTE cellular communications network. The wireless device 230 will then receive information corresponding to that carried in System Information Block (SIB) 2 broadcasted by RBSs associated with the first MBSFN already from the RBS 250, even though the RBS 250 is not associated with the first MBSFN. Said information corresponding to that carried in SIB 2 broadcasted by RBSs associated with the first MBSFN is, according to some aspects further discussed below, comprised in a modified SIB 2. This information relates to the sub-frames that are being used for Multicast-Broadcast Multimedia Services (MBMS) in the first MBSFN 210. In a similar fashion, the wireless device also receives information corresponding to that carried in SIB 13 broadcasted by RBSs associated with the first MBSFN already from the RBS 250, which enables the wireless device to locate the so-called MBMS Control Channel (MCCH) in the LTE radio frame structure used within the first MBSFN. The MCCH, in turn, carries information allowing the wireless device to discover which Temporary Mobile Group Identities (TMGI) that are available, and where broadcasted media corresponding to the TMGIs can be found, i.e., which communications resources that are used for broadcasting which services. However, the actual MCCH cannot be received until the wireless device 231 comes within coverage of the first MBSFN. Said information corresponding to that carried in SIB 13 broadcasted by RBSs associated with the first MBSFN is, according to some aspects further discussed below, comprised in a modified SIB 13 broadcasted by the RBS 250.

According to some aspects, the information relating to the first communications resource f1 comprises a service announcement, and the service announcement comprises information about Multicast-Broadcast Multimedia Service (MBMS) content broadcasted in the first MBSFN 210. Further, the information relating to the first communications resource f1 may comprise a Temporary Mobile Group Identification (TMGI) corresponding to the service A broadcasted in the first MBSFN 210.

Also, according to some aspects, the information relating to the first communications resource f1, broadcasted by the RBS 250, comprises a modified System Information Block, SIB, 2, and the modified SIB 2 comprises information relating to and/or identifying one or more LTE sub-frames that have been reserved for MBMS in the first MBSFN 210.

Furthermore, according to aspects, the information relating to the first communications resource f1, broadcasted by the RBS 250, comprises a modified SIB 13, the modified SIB 13 comprising information relating to and/or identifying a location of an MBMS Control Channel (MCCH) in an LTE radio frame structure of the first MBSFN.

A modified SIB will now be described and exemplified.

A SIB 2 or 13 according to prior art, e.g., as described in 3GPP TS 36.331 V.12.5.0 March 2015 and references cited therein, comprises information relating only to broadcasts in the MBSFN comprising the RBS broadcasting the SIB. In other words, SIBs carrying information about broadcasted services using some communications resource are only available in the network that actually does the broadcasting using the communications resource. A SIB according to prior art thus only comprises information relating to MBMS in the MBSFN comprising the RBS that transmitted the SIB.

A modified SIB on the other hand also comprises information related to broadcasts by transmitters comprised in MBSFNs other than the MBSFN of the RBS broadcasting the modified SIB.

The modified SIB thus comprises information about broadcasts in other MBSFNs, such as neighboring MBSFNs, different from the MBSFN of the RBS transmitting the modified SIB. A wireless device receiving a modified SIB does not only learn about broadcasts in, e.g., neighboring MBSFNs, but it also learns that these broadcasts are not available from a present RBS, or by the present MBSFN.

As an example relating to said modified SIB 2 and SIB 13, consider an LTE network. 3GPP TS 36.331 V 12.5.0 March 2015 Evolved Universal Terrestrial Radio Access (E-UTRA); Radio Resource Control (RRC); Protocol specification defines a number of elements of the SIB 2 and SIB 13. One such element of the SIB 2 relates to MBSFN allocation. This element is referred to as MBSFN-SubframeConfigList and is defined as:

MBSFN-SubframeConfigList::=SEQUENCE (SIZE (1 . . . maxMBSFN-Allocations)) OF MBSFN-SubframeConfig.

In an example modified SIB 1, this element has been copied and renamed. Thus, a new element is introduced in the modified SIB 2 which comprises information relating to and/or identifying one or more LTE sub-frames that have been reserved for MBMS in a neighboring MBSFN, such as the first MBSFN 210. This new element is, according to aspects, defined as:

neig-MBSFN-SubframeConfigList::=SEQUENCE (SIZE (1 . . . maxMBSFN-Allocations)) OF MBSFN-SubframeConfig, where 'neigh' is short for 'neighboring'.

The new SIB 2 element then comprises MBSFN configuration related to an MBSFN other than the MBSFN of the RBS that transmitted the modified SIB.

In a similar way, a modified SIB 13, according to aspects, comprises the new element neigh-mbsfn-AreaInfoList-r9 of type MBSFN-AreaInfoList-r9, in addition to the already existing element mbsfn-AreaInfoList-r9 of type MBSFN-AreaInfoList-r9. These elements together comprise information corresponding both present and other MBSFNs.

Figure 3:
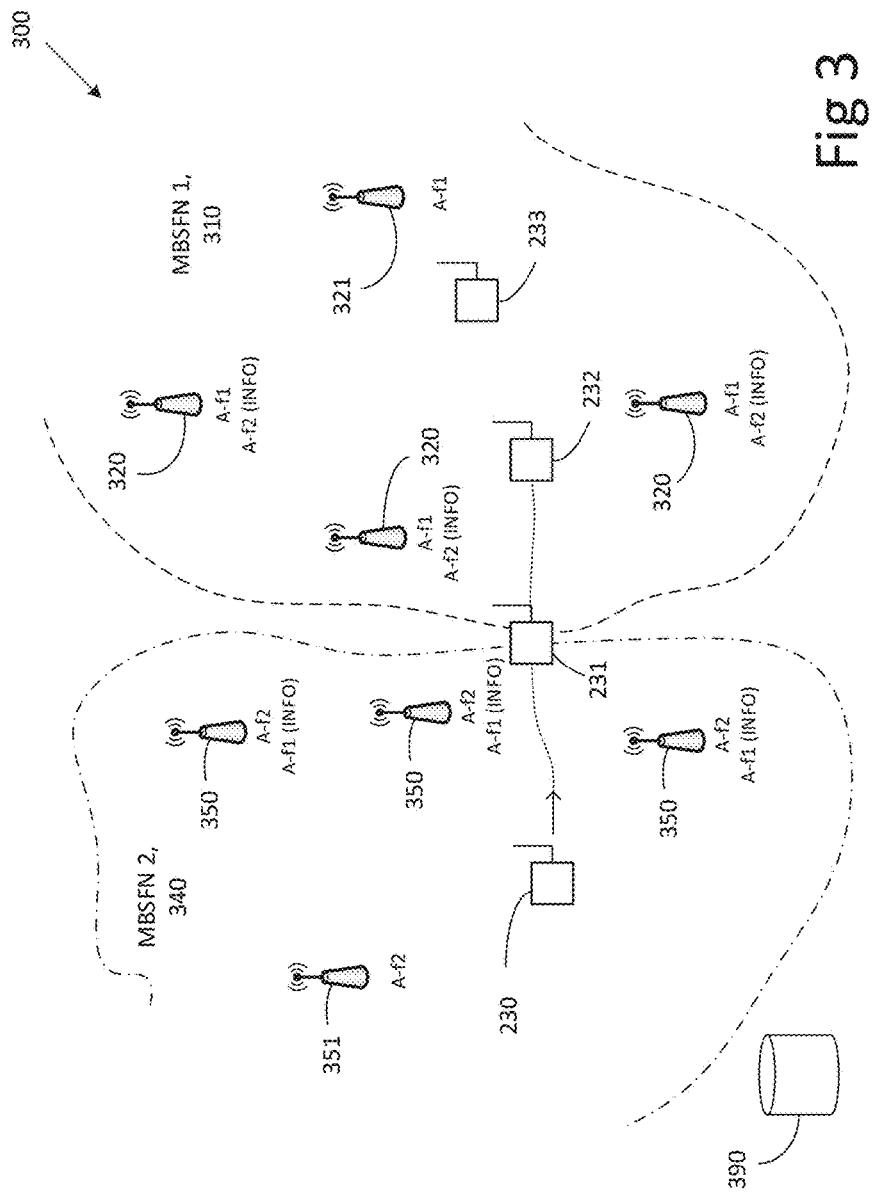
FIG. 3 shows a schematic view of a wireless communication system having first and second MBSFNs according to aspects of the present disclosure.

FIG. 3 shows a schematic view of a wireless communication system having first and second MBSFNs according to aspects of the present disclosure. In particular, FIG. 3 illustrates a wireless communication system 300, such as the one shown in FIG. 2, but also comprising a second MBSFN 340, at least partly separate from the first MBSFN 310. The at least one RBS 350 is associated to the second MBSFN 340, i.e., it is comprised by the second MBSFN, and arranged to broadcast transport blocks using a second communications resource f2. The transport blocks using the second communications resource f2 are transporting the service A to one or more further wireless devices 230, 231 in the wireless communication system 300.

It is appreciated that the present technique is applicable in indoor as well as in outdoor communication systems, and also in communication systems comprising both indoor and outdoor coverage areas. It is further appreciated that one MBSFN coverage area may be comprised in another MBSFN area, for instance when one MBSFN is deployed inside a building, which building is in turn located within a coverage area of a larger outdoor MBSFN. Also, an MBSFN transmitter or RBS may, according to aspects, be associated with the first 310 and also with the second MBSFN 340.

Figure 4:
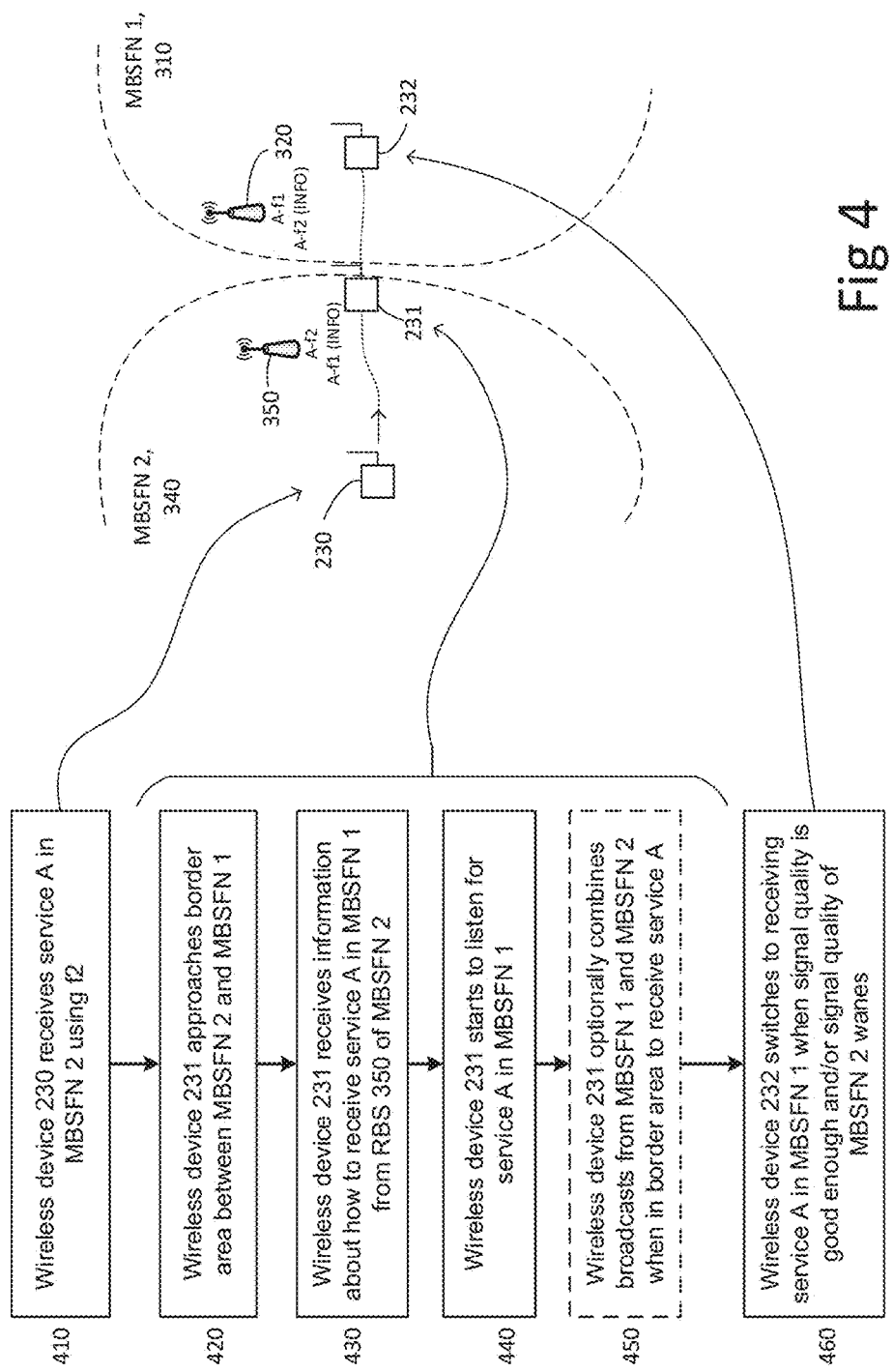
FIG. 4 illustrates a sequence of events in a wireless communication system according to aspects of the present disclosure.

The advantageous effects relating to service continuity of the proposed techniques can be understood by looking at FIG. 3 and FIG. 4. FIG. 4 illustrates an example sequence of events in a wireless communication system, such as the wireless communication system shown in FIG. 3. Suppose a wireless device 230 is located within a coverage area of the second MBSFN 340, and that it is receiving 410 a service A that is being broadcasted within the second MBSFN 340 using communications resource f2. Suppose further that the wireless device is moving towards the coverage area of the first MBSFN 310 and therefore approaches 420 a border area between the two MBSFNs. Thus, at some point in time the broadcasts in the second MBSFN can no longer be received, and the wireless device will want to switch 460 to receiving the same service A in the first MBSFN.

According to the proposed technique, the wireless device is not transferred to unicast. Rather, it learns about broadcasted services in neighboring MBSFN areas before actually entering them. This learning 430 is achieved by configuring, e.g., RBSs adjacent to an MBSFN to broadcast system information about services that are being broadcasted in the neighbor MBSFN. This will make the wireless device 231 aware of the neighbor broadcast service before entering the MBSFN. The wireless device can then start to listen for 440 and potentially start to receive the broadcasted service before leaving the current MBSFN area. As an option, the wireless device can also apply combining 450 to improve transport block quality in terms of an improved signal to noise ratio, and improved signal to interference and noise ratio, or improved transport block error resilience. Consequently, the wireless device can, by the present teaching, now start listening to the new service without any service interrupt and optionally continue to listen to the old service as long as the coverage is sufficient. Thus, service continuity is improved.

According to some aspects, a service TMGI, say TMGI X, in the second MBSFN and in the first MBSFN may be identical or contain partially identical group data. If the services are different they can be identified by different Flow IDs for localized services in an MBMS Core.

Of course, the reverse sequence of events is also possible, i.e., for a wireless device moving from the first 310 to the second 340 MBSFN. In this case some border area RBSs of the first MBSFN should inform about services broadcasted in the second MBSFN 340. With reference to FIG. 3, according to some aspects, at least some of the one or more further RBSs 320 comprised by the first MBSFN 310 are arranged to broadcast information relating to the second communications resource f2 used for broadcasting service A in the second MBSFN 340.

According to aspects, some of the transport blocks broadcasted in the first and in the second MBSFN are transporting the same service and are also combinable upon reception by a wireless device into combined transport blocks having an improved transport block quality compared to the transport block quality before combining. This means that if the same service is transmitted in two MBSFNs, i.e., service A in FIG. 3, then a wireless device 231 that is positioned to receive signals from both MBSFNs at the same time will receive service A broadcasts transmitted in different communications resources, e.g., in different sub-frames of an LTE cellular communication system.

Now, if there are more bit errors than it is possible to error correct using one transport block, the wireless device 231 may perform error correction by also considering the second or additional transport block or blocks received on the other communications resource, and thus increase the probability of error correcting the block. The sub-set of transport blocks transporting the same service are thus combinable upon reception into combined transport blocks having an improved transport block quality compared to the transport block quality before combining.

As an alternative or complement to performing error correction based on more than one received transport block, the wireless device 231 may combine the two transport blocks prior to performing error correction, i.e., perform soft receive diversity combining of the transport blocks transporting the same service.

As a further alternative or complement to performing error correction based on more than one received transport block, the wireless device 231 may perform error correction on both transport blocks individually, and then select the transport block most likely to be correctly decoded as the transport block to use, and discard the other transport block. The transport block most likely to be correctly decoded can be selected by, e.g., determining a Hamming distance between a received transport block and the transport block after error correction.

According to aspects, the improved transport block quality is at least any one of improved signal to noise ratio, improved signal to interference and noise ratio, improved transport block error resilience, and improved transport block error probability.

FIGS. 2 and 3 also shows a server device 290, 390 arranged to provide information to wireless devices in the wireless communication system 230, 231, 232, 233 regarding which transport blocks broadcasted in the wireless communication system that are combinable upon reception by a wireless device 231 into combined transport blocks having an improved transport block quality compared to the transport block quality before combining.

According to aspects, the server device 290, 390 comprises a Group Communication Service Application Server, GCS AS, according to 3GPP TS 22.468 V13.0.0 December 2014. Also, The server device 290, 390 may be comprised in an RBS of the wireless communication system 200, 300, or it may be implemented as a stand-alone device.

Turning back again to the wireless devices 231 shown in FIGS. 2, 3, and 4; This wireless device is arranged for MBSFN communication, and also to receive information relating to a first communications resource f1 used for broadcasting a service A in a first MBSFN from an RBS 250 not comprised in the first MBSFN.

According to some aspects, as discussed above, the wireless device 231 is further arranged to receive first and second transport blocks using first and second communications resources f1, f2, respectively, which first and second communications resources transport a service A. The wireless device 231 is also arranged to combine said received first and second transport blocks into a combined transport block having an improved transport block quality compared to a transport block quality before combining.

The combining feature of the wireless device was discussed above, and will therefore not be discussed again here.

According to aspects, the wireless device 231 is further arranged to receive information regarding broadcasted transport blocks that are combinable upon reception from a wireless communication system server device 290, 390. Thus, the wireless device may obtain information which, e.g., prompts it to start receiving the same service using several communications resources, and to perform the combining of transport blocks as discussed above.

According to some further aspects, the wireless device 231 is arranged to simultaneously store two or more MBSFN configurations relating to at least the first and to the second MBSFN. This feature allows the wireless device to monitor broadcasts in more than one MBSFN, in order to, e.g., measure signal quality of the different broadcasts, in order to determine when to switch between different MBSFN broadcasts, and possibly when to combine two or more broadcasts of the same service in two or more different MBSFNs.

Thus, the wireless device is prepared and enabled to receive broadcasts from two or more MBSFNs which the wireless device is presently not in coverage of. The wireless device is also enabled to receive broadcasts in one MBSFN while simultaneously evaluating received signal quality in another neighboring MBSFN.

Figure 5:
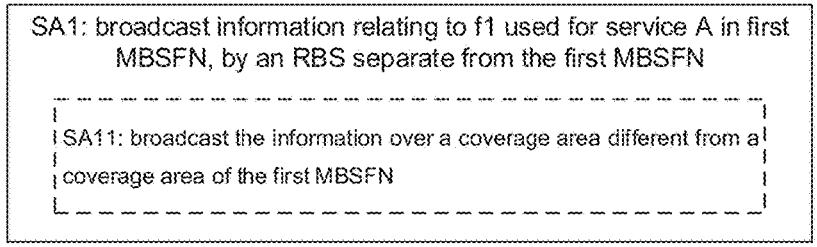
FIG. 5 shows a flowchart illustrating methods performed in a radio base station according to aspects of the present disclosure.

FIG. 5 shows a flowchart illustrating methods performed in an RBS according to aspects of the present disclosure. The RBS is separate from, i.e., not comprised in, a first MBSFN, the method comprises broadcasting SA1, by the RBS, information relating to a first communications resource f1 used for broadcasting a service A in the first MBSFN. The RBS 250, 350 is shown, and was discussed in connection with, FIG. 2 and FIG. 3 above.

According to aspects, the broadcasting further comprises broadcasting SA11 information relating to the first communications resource f1 over a coverage area 251 different from a coverage area 211 of the first MBSFN 210. This coverage area 251 is illustrated schematically in FIG. 2.

Figure 6:
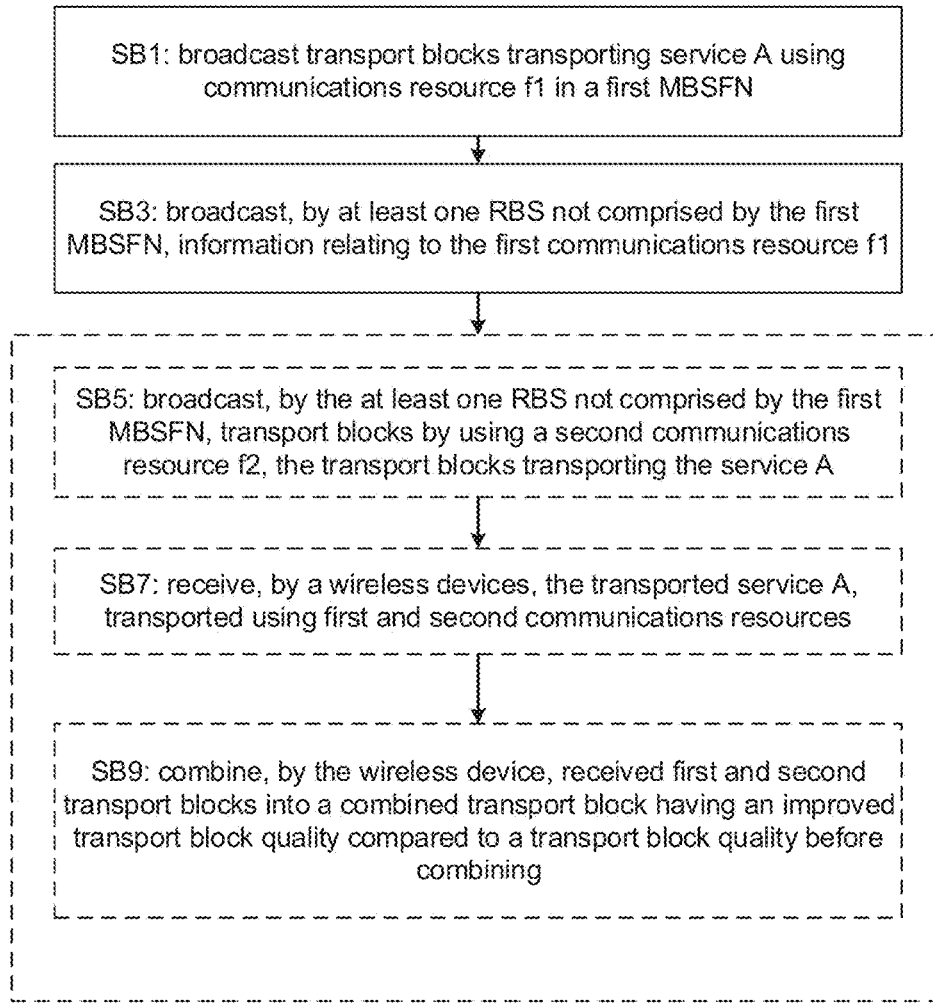
FIG. 6 shows a flowchart illustrating methods performed in a wireless communication system according to aspects of the present disclosure.

FIG. 6 shows a flowchart illustrating methods performed in a wireless communication system according to aspects of the present disclosure. In particular, there is illustrated a method performed in a wireless communication system 200 comprising a first MBSFN 210. The first MBSFN comprises one or more further RBSs 220. The wireless communication system 200 also comprises at least one RBS 250 not comprised by the first MBSFN 210. The method comprises broadcasting SB1, by the one or more further RBSs comprised by the first MBSFN, transport blocks by using a first communications resource f1. The transport blocks are transporting a service A. The method also comprises broadcasting SB3, by the at least one RBS 250 not comprised by the first MBSFN 210, information relating to the first communications resource f1 used for broadcasting the service A in the first MBSFN.

According to aspects, said communications resources comprise any of frequency bands, time slots, LTE subframes, or a combination of frequency bands and time slots. Hereby, since the disclosed techniques are applicable for a range of different communications resources and system architectures, the techniques can be applied in a variety of different communication systems. Thus, flexibility in deploying broadcasting functionality in a wireless communication network is achieved, while maintaining said less complicated service continuity process.

According to aspects, the at least one RBS 350 is associated to a second MBSFN 340 at least partly separate from the first MBSFN 310. The method then further comprises broadcasting SB5, by the at least one RBS 350 not comprised by the first MBSFN, transport blocks by using a second communications resource f2, the transport blocks transporting the service A, and receiving SB7, by a wireless devices 231, the transported service A, transported using first and second communications resources, as well as combining SB9, by the wireless device, received first and second transport blocks into a combined transport block having an improved transport block quality compared to a transport block quality before combining.

Hereby, a wireless device participating in group communication involving said same service broadcasted in more than one MBSFN can receive the service on two different communications resources at the same time, which enables seamless transition between MBSFNs, i.e., improved service continuity. This service continuity does not involve transferring a wireless device from multicast to unicast.

Also, a wireless device may benefit from improved reception conditions due to the combining. On a network level, these improved reception conditions may allow for, e.g., a reduction in the number of reserved cells used in the wireless communication system. One or more service coverage areas related to MBMS may also be extended due to the combining.

Figure 7:
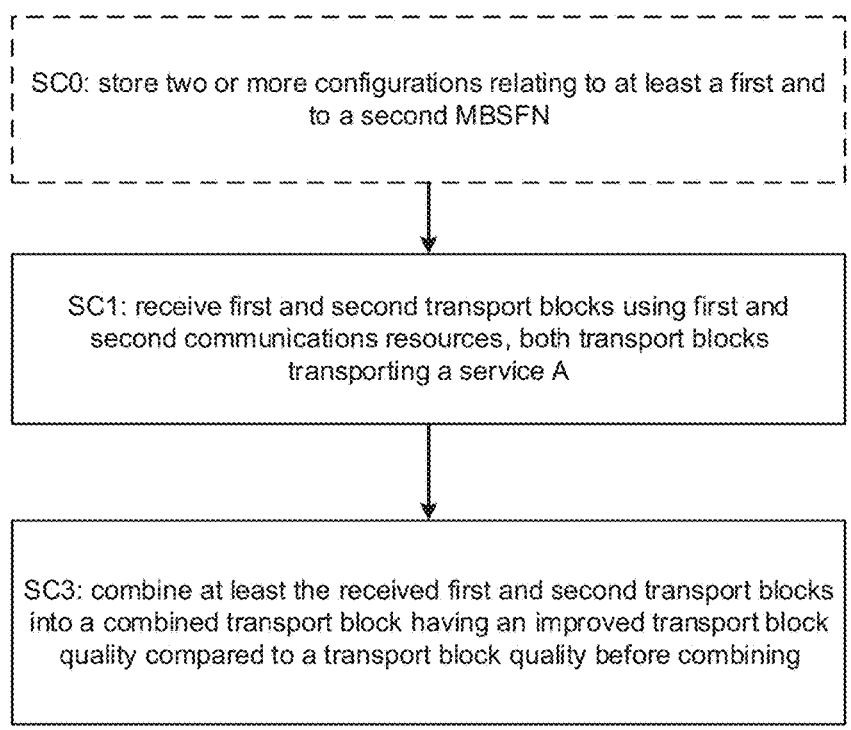
FIG. 7 shows a flowchart illustrating methods performed in a wireless device according to aspects of the present disclosure.

FIG. 7 shows a flowchart illustrating methods performed in a wireless device according to aspects of the present disclosure. In particular, there is illustrated a method in a wireless device 231 arranged for MBSFN communication. The method comprises receiving SC1, by the wireless device, first and second transport blocks using first and second communications resources f1, f2, from a first 310 and from a second 340 MBSFN, respectively. The transport blocks are transporting a service A. The method also comprises combining SC3, by the wireless device, at least the received first and second transport blocks into a combined transport block having an improved transport block quality compared to a transport block quality before combining.

According to aspects, the method further comprises storing SC0, by the wireless device 231, two or more MBSFN configurations relating to at least the first 310 and to the second 340 MBSFN.

The methods performed in a wireless device, and the associated advantages, have already been discussed above in connection to FIGS. 2-4.

Figure 8:
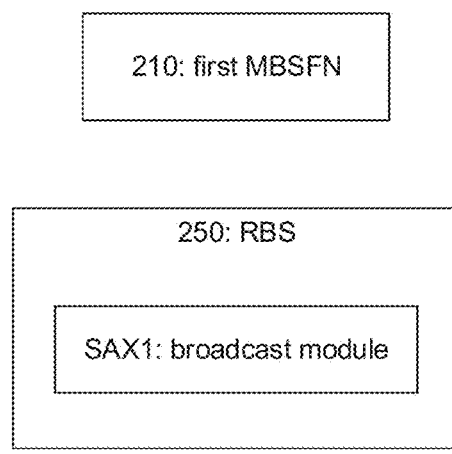
FIG. 8 schematically illustrates a radio base station according to aspects of the present disclosure.

FIG. 8 schematically illustrates a radio base station according to aspects of the present disclosure. The RBS is separate from, i.e., not comprised in, a first MBSFN 210. The RBS comprises a broadcast module SAX1 configured to broadcast, by the RBS, information relating to a first communications resource f1 used for broadcasting a service A in the first MBSFN.

According to aspects, the broadcast module SAX1 is further configured to broadcast information relating to the first communications resource f1 over a coverage area 251 different from a coverage area of the first MBSFN 210.

Figure 9:
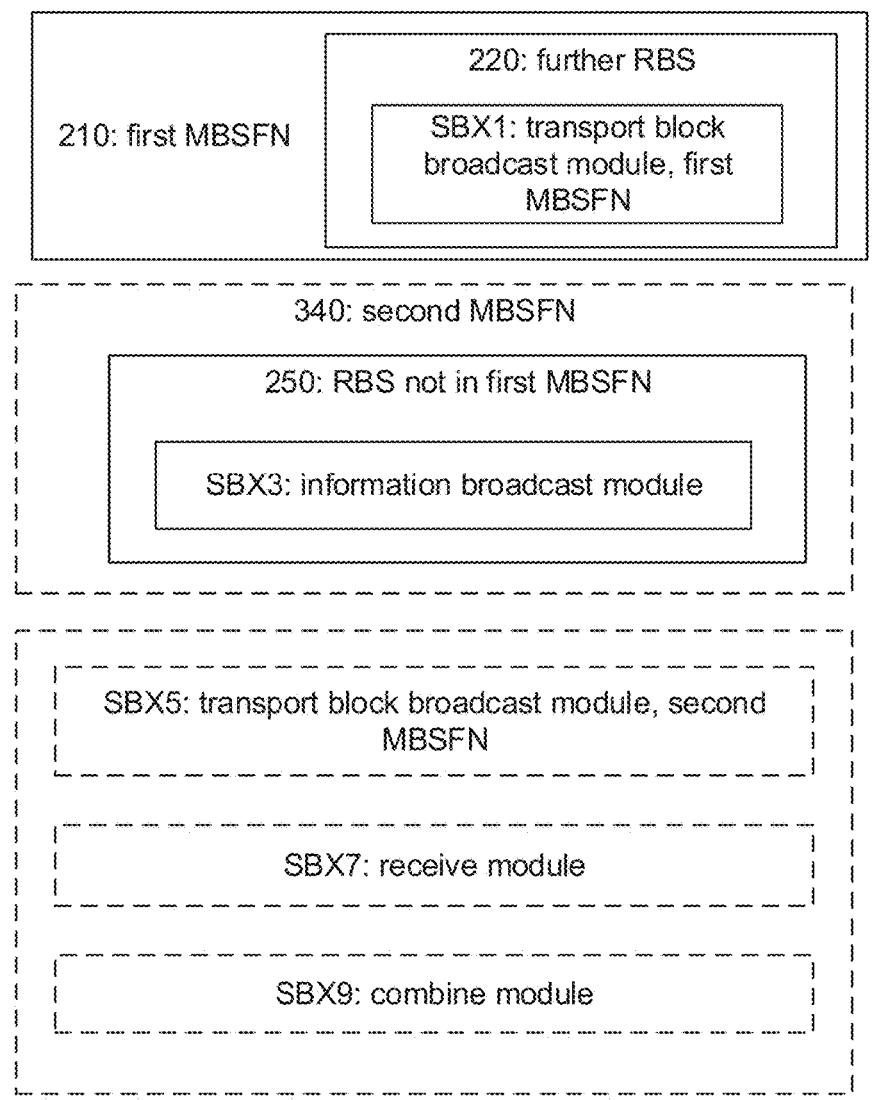
FIG. 9 schematically illustrates a wireless communication system according to aspects of the present disclosure.

FIG. 9 schematically illustrates a wireless communication system according to aspects of the present disclosure. The wireless communication system comprises a first MBSFN 210. The first MBSFN comprises one or more further RBSs 220. The wireless communication system 200 also comprises at least one RBS 250 not comprised by the first MBSFN 210. The wireless communication system comprises a transport block broadcast module SBX1 configured to broadcast, by the one or more further RBSs comprised by the first MBSFN, transport blocks by using a first communications resource f1. The transport blocks are transporting a service A.

The wireless communication system also comprises a an information broadcast module SBX3 configured to broadcast, by the at least one RBS 250 not comprised by the first MBSFN 210, information relating to the first communications resource f1 used for broadcasting the service A in the first MBSFN.

According to aspects, the at least one RBS is associated to a second MBSFN 340 at least partly separate from the first MBSFN 310. The wireless communication system then further comprises a transport block broadcast module SBX5 for the second MBSFN. This module is configured to broadcast, by the at least one RBS not comprised by the first MBSFN, transport blocks by using a second communications resource f2, the transport blocks transporting the service A. There is also comprised a receiving module SBX7 configured to receive, by a wireless device 231, the transported service A, transported using first and second communications resources, as well as a combining module SBX9 configured to combine, by the wireless device, received first and second transport blocks into a combined transport block having an improved transport block quality compared to a transport block quality before combining.

Figure 10:
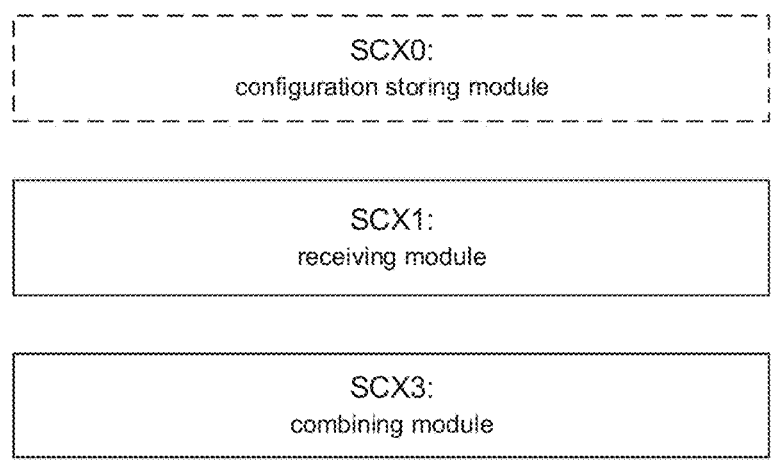
FIG. 10 schematically illustrates a wireless device according to aspects of the present disclosure.

FIG. 10 schematically illustrates a wireless device according to aspects of the present disclosure. The wireless device is arranged for MBSFN communication, and comprises a receiving module SCX1 configured to receive first and second transport blocks using first and second communications resources f1, f2, from a first 310 and from a second 340 MBSFN, respectively. The transport blocks are transporting a service A. The wireless device also comprises a combining module SCX3 configured to combine at least the received first and second transport blocks into a combined transport block having an improved transport block quality compared to a transport block quality before combining.

According to some aspects, the wireless device also comprises a configuration storing module SCX0 configured to store two or more MBSFN configurations relating to at least the first and to the second MBSFN.

The various aspects of the methods described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc., that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, implemented in a radio base station, of service continuity between Multicast-Broadcast Single Frequency Networks (MBSFNs), the method comprising:
broadcasting a service on a Multicast-Broadcast Multimedia Service (MBMS) resource of a first MBSFN providing a first coverage area;
broadcasting information identifying a different MBMS resource over which the service is being broadcast by a different radio base station in a different MBSFN providing a different coverage area to enable service continuity between the coverage areas of the first MBSFN and different MBSFN for a wireless device receiving the service.

2. The method of claim 1, wherein broadcasting the information to enable service continuity between the first MBSFN and different MBSFN comprises enabling service continuity between the first MBSFN and different MBSFN for the wireless device without transferring the wireless device to unicast for the service.

3. The method of claim 1, wherein broadcasting the information identifying the different MBMS resource comprises broadcasting the information in a service announcement announcing that MBMS content of the service is broadcast in the different MBSFN.

4. The method of claim 1, wherein broadcasting the information identifying the different MBMS resource comprises broadcasting identification of which Temporary Mobile Group Identity (TMGI) corresponds to the service being broadcast in the different MBSFN.

5. The method of claim 1, further comprising transmitting a system information block indicating where an MBMS control channel carrying the information identifying the different MBMS resource is located in a radio frame structure of the first MBSFN.

6. A radio base station comprising:
a radio transmitter configured to produce radio signals;
computing hardware communicatively coupled to the radio transmitter and configured to control the radio transmitter to:
broadcast a service on a Multicast-Broadcast Multimedia Service (MBMS) resource of a first MBSFN providing a first coverage area;
broadcast information identifying a different MBMS resource over which the service is being broadcast by a different radio base station in a different MBSFN providing a different coverage area to enable service continuity between the coverage areas of the first MBSFN and different MBSFN for a wireless device receiving the service.

7. The radio base station of claim 6, wherein to broadcast the information to enable service continuity between the first MBSFN and different MBSFN, the radio transmitter is controlled by the computing hardware to enable service continuity between the first MBSFN and different MBSFN for the wireless device without transferring the wireless device to unicast for the service.

8. The radio base station of claim 6, wherein to broadcast the information identifying the different MBMS resource, the radio transmitter is controlled by the computing hardware to broadcast the information in a service announcement announcing that MBMS content of the service is broadcast in the different MBSFN.

9. The radio base station of claim 6, wherein to broadcast the information identifying the different MBMS resource the radio transmitter is controlled by the computing hardware to broadcast identification of which Temporary Mobile Group Identity (TMGI) corresponds to the service being broadcast in the different MBSFN.

10. The radio base station of claim 6, wherein the radio transmitter is further controlled by the computing hardware to transmit a system information block indicating where an MBMS control channel carrying the information identifying the different MBMS resource is located in a radio frame structure of the first MBSFN.

11. A method, implemented in a wireless device, of service continuity between Multicast-Broadcast Single Frequency Networks (MBSFNs), the method comprising:
receiving, from a radio base station, a service broadcast on a Multicast-Broadcast Multimedia Service (MBMS) resource of a first MBSFN providing a first coverage area;
receiving information broadcasted by the radio base station that identifies a different MBMS resource over which the service is being broadcast by a different radio base station in a different MBSFN providing a different coverage area, the information enabling service continuity between the coverage areas of the first MBSFN and different MBSFN for the wireless device.

12. The method of claim 11, further comprising receiving the service continuity between the first MBSFN and different MBSFN without being transferred to unicast for the service.

13. The method of claim 11, wherein receiving the information identifying the different MBMS resource comprises receiving the information in a service announcement announcing that MBMS content of the service is broadcast in the different MBSFN.

14. The method of claim 11, wherein receiving the information identifying the different MBMS resource comprises receiving identification of which Temporary Mobile Group Identity (TMGI) corresponds to the service being broadcast in the different MBSFN.

15. The method of claim 11, further comprising receiving a system information block indicating where an MBMS control channel carrying the information identifying the different MBMS resource is located in a radio frame structure of the first MBSFN.

16. A wireless device comprising:
a radio receiver configured to receive radio signals;
computing hardware communicatively coupled to the radio receiver and configured to control the radio receiver to:
receive, from a radio base station, a service broadcast on a Multicast-Broadcast Multimedia Service (MBMS) resource of a first MBSFN providing a first coverage area;
receive information broadcasted by the radio base station that identifies a different MBMS resource over which the service is being broadcast by a different radio base station in a different MBSFN providing a different coverage area, the information enabling service continuity between the coverage areas of the first MBSFN and different MBSFN for the wireless device.

17. The wireless device of claim 16, wherein the computing hardware is further configured to receive the service continuity between the first MBSFN and different MBSFN without being transferred to unicast for the service.

18. The wireless device of claim 16, wherein to receive the information identifying the different MBMS resource the computing hardware is configured to control the radio receiver to receive the information in a service announcement announcing that MBMS content of the service is broadcast in the different MBSFN.

19. The wireless device of claim 16, wherein to receive the information identifying the different MBMS resource the computing hardware is configured to control the radio receiver to receive identification of which Temporary Mobile Group Identity (TMGI) corresponds to the service being broadcast in the different MBSFN.

20. The wireless device of claim 16, wherein the computing hardware is further configured to control the radio receiver to receive a system information block indicating where an MBMS control channel carrying the information identifying the different MBMS resource is located in a radio frame structure of the first MBSFN.

* * * * *